(12) United States Patent
Takeuchi et al.

(10) Patent No.: US 10,719,164 B2
(45) Date of Patent: Jul. 21, 2020

(54) DISPLAY DEVICE WITH TOUCH SENSOR, POTENTIAL CONTROL METHOD, AND PROGRAM

(71) Applicant: Japan Display Inc., Tokyo (JP)

(72) Inventors: Takeya Takeuchi, Kanagawa (JP); Hiroshi Mizuhashi, Kanagawa (JP); Tadayoshi Katsuta, Aichi (JP); Takehiro Shima, Aichi (JP)

(73) Assignee: Japan Display Inc., Tokyo (JP)

( * ) Notice: Subject to any disclaimer, the term of this patent is extended or adjusted under 35 U.S.C. 154(b) by 3 days.

(21) Appl. No.: 15/459,845

(22) Filed: Mar. 15, 2017

(65) Prior Publication Data

US 2017/0185221 A1 Jun. 29, 2017

Related U.S. Application Data

(63) Continuation of application No. 13/661,580, filed on Oct. 26, 2012, now Pat. No. 9,639,191.

(30) Foreign Application Priority Data

Nov. 7, 2011 (JP) .................................. 2011-243648

(51) Int. Cl.
*G06F 3/041* (2006.01)
*G06F 3/044* (2006.01)
(Continued)

(52) U.S. Cl.
CPC .......... *G06F 3/0416* (2013.01); *G02F 1/1368* (2013.01); *G02F 1/13338* (2013.01); *G02F 1/133514* (2013.01); *G02F 1/133528* (2013.01); *G02F 1/136286* (2013.01); *G06F 3/044* (2013.01); *G06F 3/0412* (2013.01); *G02F 2001/133302* (2013.01); *G02F 2201/121* (2013.01); *G02F 2201/123* (2013.01); *G06F 2203/04101* (2013.01); *G06F 2203/04104* (2013.01)

(58) Field of Classification Search
CPC ....... G06F 3/044; G06F 3/0412; G06F 3/0416
See application file for complete search history.

(56) References Cited

U.S. PATENT DOCUMENTS

| | | | |
|---|---|---|---|
| 6,052,104 A * | 4/2000 | Lee | ...................... G02F 1/1368 345/92 |
| 6,124,840 A | 9/2000 | Kwon | |
| | (Continued) | | |

FOREIGN PATENT DOCUMENTS

JP 2009-244958 10/2009

*Primary Examiner* — Yuzhen Shen
(74) *Attorney, Agent, or Firm* — K&L Gates LLP

(57) ABSTRACT

Disclosed herein is a display device with a touch sensor, including: a plurality of display pixel electrodes; a common electrode configured to be provided opposed to the display pixel electrodes; a display function layer configured to have an image display function; a display control circuit configured to apply a display voltage between the display pixel electrodes and the common electrode based on an image signal and carry out image display control so that the display function of the display function layer be exerted; and a touch detection electrode configured to be provided opposed to the common electrode and form capacitance between the touch detection electrode and the common electrode.

6 Claims, 13 Drawing Sheets

(51) Int. Cl.
   *G02F 1/1333*   (2006.01)
   *G02F 1/1335*   (2006.01)
   *G02F 1/1362*   (2006.01)
   *G02F 1/1368*   (2006.01)

(56) References Cited

U.S. PATENT DOCUMENTS

| | | | |
|---|---|---|---|
| 6,362,643 B1* | 3/2002 | Kim | G09G 3/006 |
| | | | 324/760.02 |
| 8,411,240 B2 | 4/2013 | Harada | |
| 2002/0000965 A1* | 1/2002 | Ando | G09G 3/3677 |
| | | | 345/87 |
| 2003/0063074 A1 | 4/2003 | Kumagawa | |
| 2010/0109995 A1* | 5/2010 | Fang | G09G 3/3677 |
| | | | 345/100 |
| 2010/0253638 A1 | 10/2010 | Yousefpor et al. | |
| 2010/0295824 A1* | 11/2010 | Noguchi | G02F 1/13338 |
| | | | 345/175 |
| 2010/0328259 A1* | 12/2010 | Ishizaki | G06F 3/044 |
| | | | 345/174 |
| 2011/0210927 A1 | 9/2011 | Mizuhashi | |
| 2011/0267305 A1 | 11/2011 | Shahparnia | |
| 2012/0154360 A1* | 6/2012 | Wu | G09G 3/3677 |
| | | | 345/211 |
| 2012/0182251 A1* | 7/2012 | Krah | G06F 3/0412 |
| | | | 345/174 |
| 2012/0218482 A1 | 8/2012 | Hwang | |

* cited by examiner

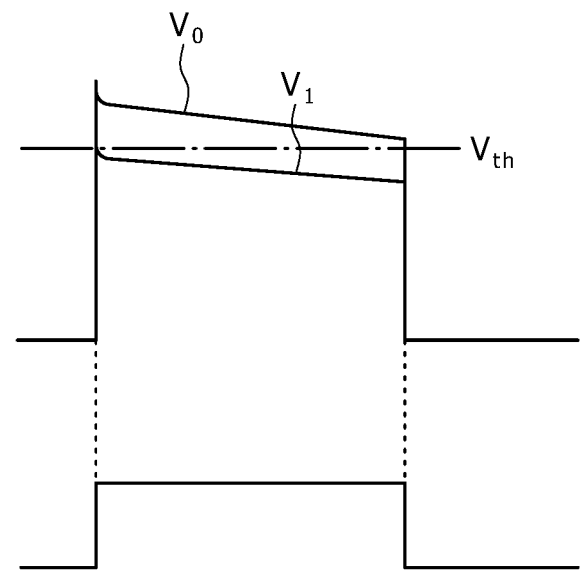

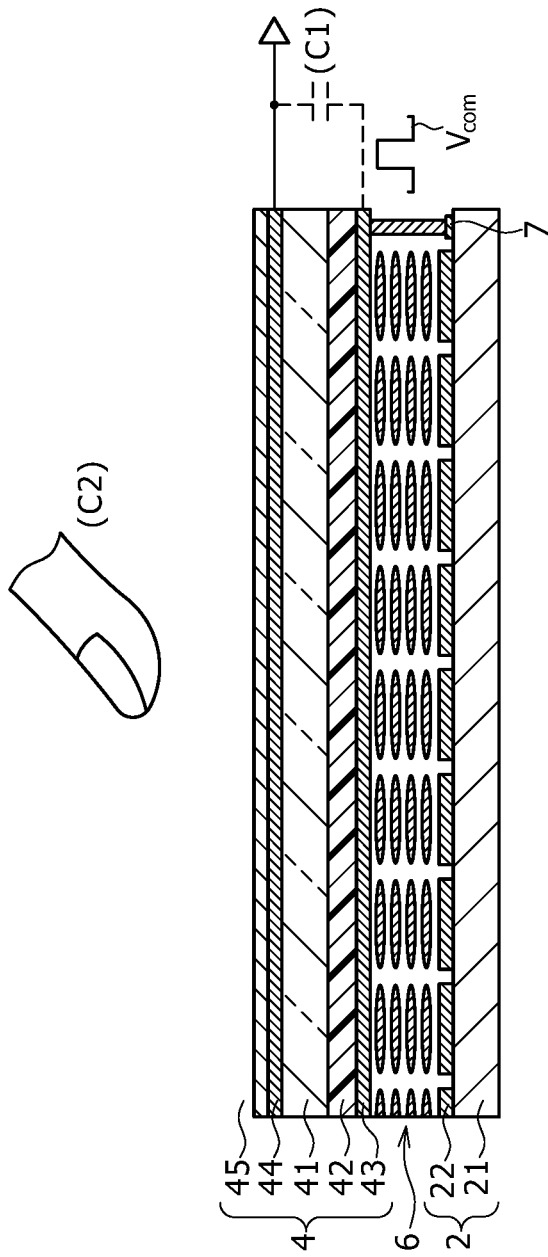

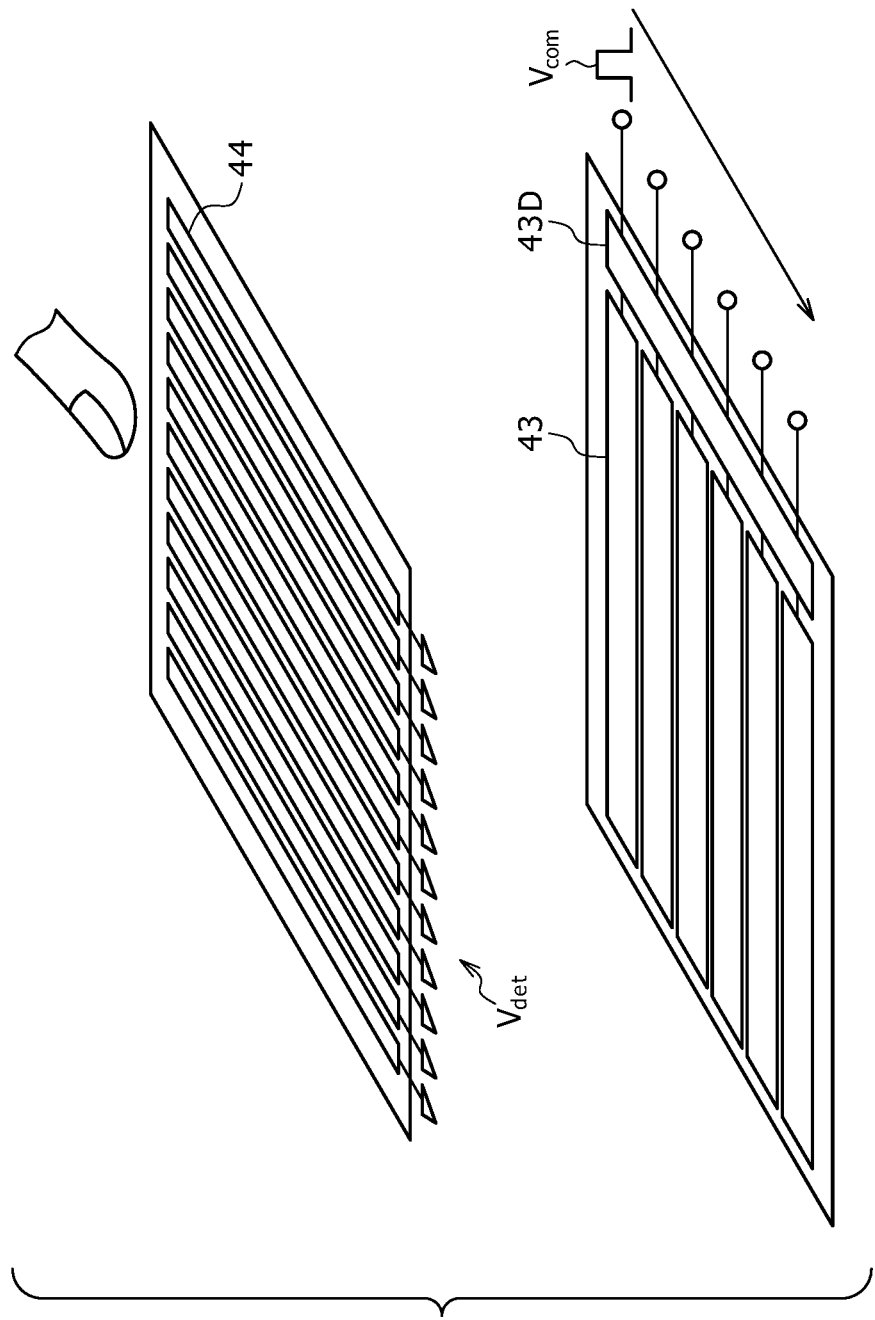

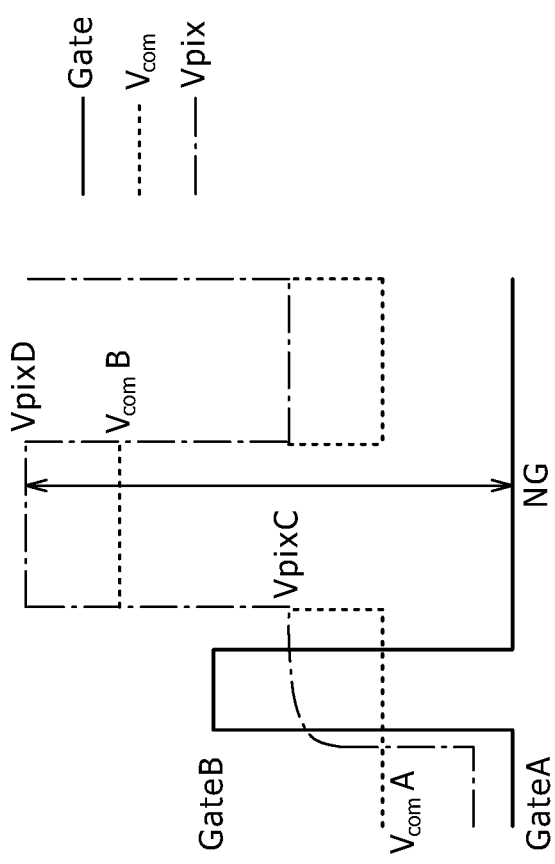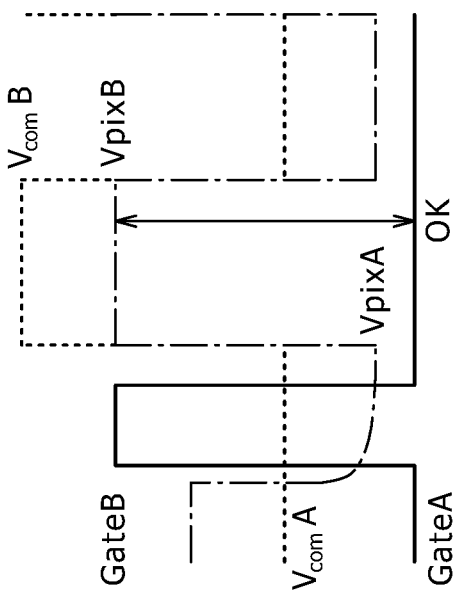
FIG. 7A  NEGATIVE POLARITY
FIG. 7B  POSITIVE POLARITY

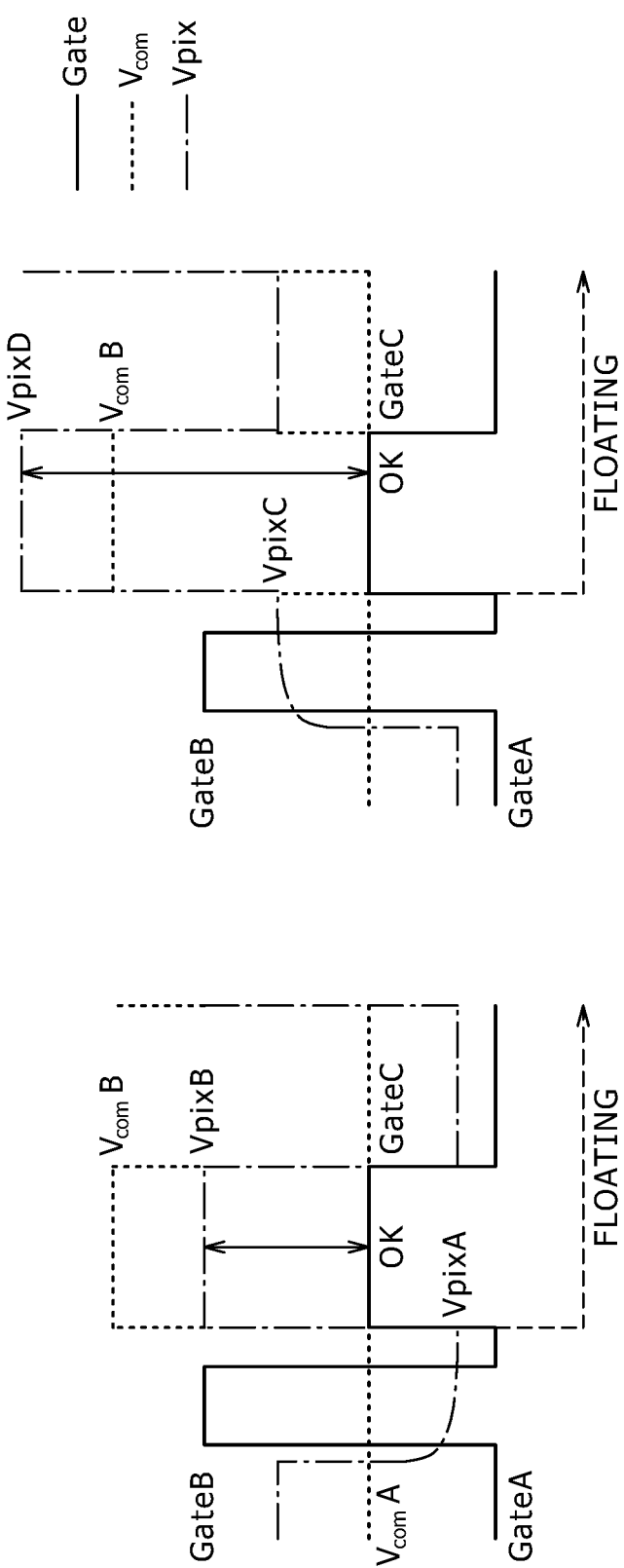

DISPLAY DEVICE WITH TOUCH SENSOR, POTENTIAL CONTROL METHOD, AND PROGRAM

CROSS REFERENCES TO RELATED APPLICATIONS

The present application is a continuation application of U.S. patent application Ser. No. 13/661,580, filed on Oct. 26, 2012, which application claims priority to Japanese Priority Patent Application JP 2011-243648 filed in the Japan Patent Office on Nov. 7, 2011, the entire content of which is hereby incorporated by reference.

BACKGROUND

The present technique relates to a display device with a touch sensor, a potential control method, and a program. Specifically, the present technique relates to a display device with a touch sensor having enhanced sensitivity of the touch sensor, a potential control method, and a program.

In recent years, attention is being paid to a display device in which a contact detecting device referred to as a so-called touch panel (hereinafter, described as the touch sensor) is mounted directly on a liquid crystal display device and the liquid crystal display device is made to display various kinds of buttons to thereby enable information input by use of these buttons instead of normal buttons. Under the trend toward a larger size of the screen of mobile apparatus, this technique permits the display to be shared also as the area in which the buttons are disposed and therefore causes large advantages of space saving and reduction in the number of parts.

However, in this technique, the thickness of the whole liquid crystal module increases because of the mounting of the touch panel. In particular, in use as mobile apparatus, a protective layer for preventing generation of scratches on the touch panel is necessary. Thus, the liquid crystal module becomes thicker and thickness reduction is difficult.

To address this problem, the following technique has been proposed. Specifically, thickness reduction is obtained by using a common electrode for displaying originally provided in a liquid crystal display element also as one (drive electrode) of a pair of touch sensor electrodes and sharing an existing common drive signal as a display drive signal also as a touch sensor drive signal (refer to e.g. Japanese Patent Laid-open No. 2009-244958 (hereinafter, Patent Document 1)).

SUMMARY

In recent years, apparatus equipped with a touch sensor increases and user needs for the touch sensor and user interface are also becoming more diverse. For example, it is desired that the following kinds of detection can also be performed: multi-touch detection to detect contact by plural fingers; detection of finger adjacency (so-called proximity); and detection by an ultra-fine pen. To perform such detection with high accuracy, the sensitivity of the touch sensor needs to be enhanced.

For detection of the ultra-fine pen with high accuracy, sensor/noise (S/N) needs to be enhanced. For adjacency detection, i.e. for detection of the so-called proximity, the S/N needs to be further enhanced. Enhancement in the sensitivity of the touch sensor in Patent Document 1 can be realized by increasing the amplitude of the common drive signal shared as the display drive signal and the touch sensor drive signal. By increasing the amplitude (Tx amplitude) of the common drive signal, the electric field intensity greatly changes and enhancement in the accuracy is enabled.

On the other hand, the thin film transistor (TFT) used in the liquid crystal display has the withstand voltage under which the reliability is ensured. If a voltage higher than this standard voltage is applied to the TFT, the TFT is broken to become non-functional as a semiconductor device. If the voltage applied to the TFT becomes equal to or higher than the withstand voltage under which the reliability of the TFT is ensured due to the increase in the amplitude (Tx amplitude) of the common drive signal, possibly the pixel TFT is broken and image failure and reliability failure occur. Therefore, it is difficult to increase the amplitude of the common drive signal. For this reason, it is also difficult to enhance the accuracy of the touch sensor.

There is a need for the present technique to allow enhancement in the accuracy of the touch sensor.

According to an embodiment of the present technique, there is provided a display device with a touch sensor, including a plurality of display pixel electrodes, a common electrode configured to be provided opposed to the display pixel electrodes, a display function layer configured to have an image display function. The display device further includes a display control circuit configured to apply a display voltage between the display pixel electrodes and the common electrode based on an image signal and carry out image display control so that the display function of the display function layer be exerted and a touch detection electrode configured to be provided opposed to the common electrode and form capacitance between the touch detection electrode and the common electrode. A display drive voltage applied to the common electrode by the display control circuit is utilized as a touch sensor drive signal, and the potential of a gate of a TFT circuit connected to the display pixel electrode is set to a floating state during application of the touch sensor drive signal.

According to another embodiment of the present technique, there is provided a potential control method of a display device with a touch sensor. The display device includes a plurality of display pixel electrodes, a common electrode provided opposed to the display pixel electrodes, and a display function layer having an image display function. The display device further includes a display control circuit that applies a display voltage between the display pixel electrodes and the common electrode based on an image signal and carries out image display control so that the display function of the display function layer be exerted and a touch detection electrode that is provided opposed to or in juxtaposition with the common electrode and forms capacitance between the touch detection electrode and the common electrode. The potential control method includes utilizing a display drive voltage applied to the common electrode by the display control circuit as a touch sensor drive signal, and setting the potential of a gate of a TFT circuit connected to the display pixel electrode to a floating state during application of the touch sensor drive signal.

According to another embodiment of the present technique, there is provided a program for causing a computer that controls a display device with a touch sensor to execute processing. The display device includes a plurality of display pixel electrodes, a common electrode provided opposed to the display pixel electrodes, and a display function layer having an image display function. The display device further includes a display control circuit that applies a display voltage between the display pixel electrodes and the common electrode based on an image signal and carries out image display control so that the display function of the display function layer be exerted and a touch detection electrode that is provided opposed to the common electrode and forms capacitance between the touch detection electrode and the common electrode. The processing is executed for carrying out a process including utilizing a display drive voltage applied to the common electrode by the display control circuit as a touch sensor drive signal, and setting the potential of a gate of a TFT circuit connected to the display pixel electrode to a floating state during application of the touch sensor drive signal.

In the display device with a touch sensor, the potential control method, and the program according to the embodiments of the present technique, the plurality of display pixel electrodes, the common electrode provided opposed to the display pixel electrodes, and the display function layer having the image display function are provided. In addition, the display control circuit that applies the display voltage between the display pixel electrodes and the common electrode based on the image signal and carries out image display control so that the display function of the display function layer may be exerted and the touch detection electrode that is provided opposed to the common electrode and forms capacitance between the touch detection electrode and the common electrode are provided. Furthermore, the display drive voltage applied to the common electrode by the display control circuit is utilized as the touch sensor drive signal, and processing for setting the potential of the gate of the TFT circuit connected to the display pixel electrode to the floating state during application of the touch sensor drive signal is executed.

According to the embodiments of the present technique, the accuracy of the touch sensor can be enhanced.

Additional features and advantages are described herein, and will be apparent from the following Detailed Description and the figures.

BRIEF DESCRIPTION OF THE FIGURES

FIGS. 3A and 3B are diagrams for explaining the operation principle of the display device with the touch sensor and are diagrams showing one example of the waveforms of drive signal and detection signal of the touch sensor;

FIG. 4 is a sectional view showing the schematic sectional structure of the display device with the touch sensor;

FIG. 5 is a perspective view showing one configuration example of the major part (common electrode and sensor detection electrode) of the display device with the touch sensor;

FIGS. 7A and 7B are diagrams showing potential relationships in the cases of the positive polarity and the negative polarity;

FIGS. 8A and 8B are diagrams showing potential relationships in the cases of the positive polarity and the negative polarity;

DETAILED DESCRIPTION

An embodiment of the present technique will be described below with reference to the drawings.

The present technique can be applied to a device whose thickness is reduced by using a common electrode for displaying provided in a liquid crystal display element also as one (drive electrode) of a pair of touch sensor electrodes and sharing an existing common drive signal as a display drive signal also as a touch sensor drive signal. First, explanation will be made about such a device.

[Display Device with Touch Sensor]

Figure 1B:
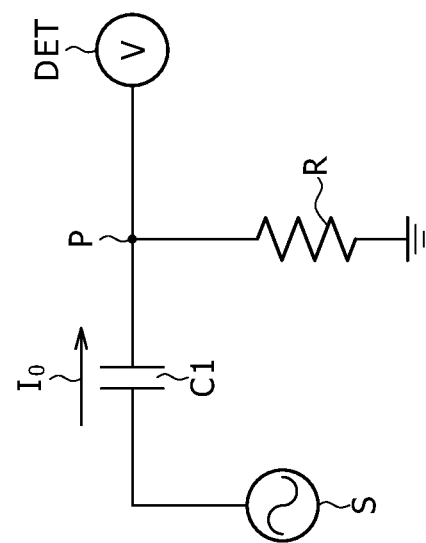
FIGS. 1A and 1B are diagrams for explaining the operation principle of a display device with a touch sensor to which an embodiment of the present technique is applied and are diagrams showing the state when a finger is not in contact.
Figure 1A:
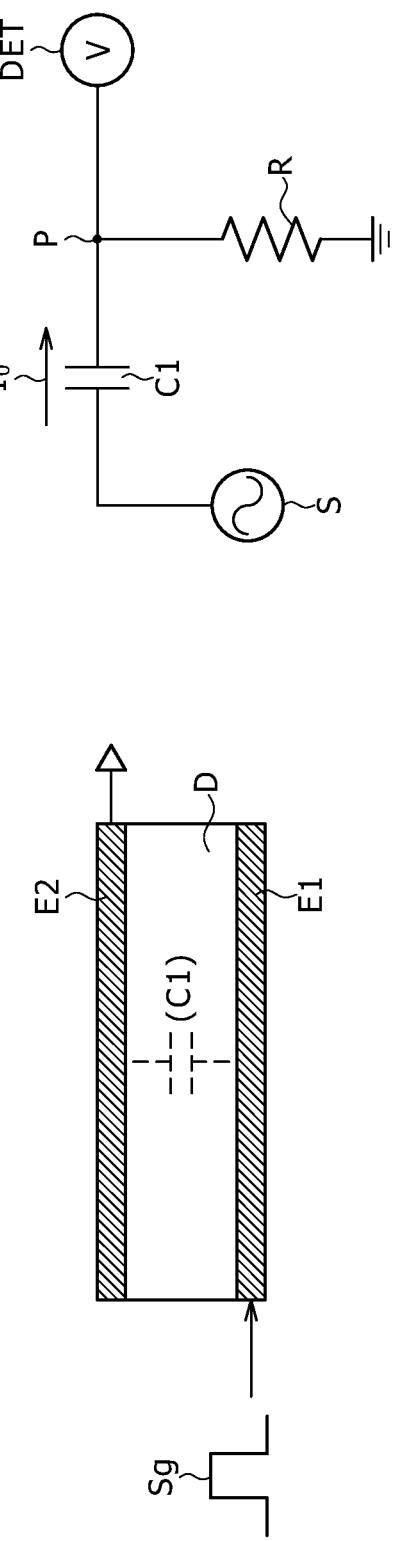

With reference to FIG. 1A to FIG. 3B, the basic principle of a touch detection system in a display device with a touch sensor according to the present embodiment will be shown. This touch detection system is embodied as a capacitive touch sensor. In this touch detection system, as shown in FIG. 1A, a pair of electrodes (drive electrode E1 and detection electrode E2) that are so disposed as to be opposed to each other with the intermediary of a dielectric D are used and a capacitive element is configured.

This structure is represented as an equivalent circuit shown in FIG. 1B. A capacitive element C1 is configured by the drive electrode E1, the detection electrode E2, and the dielectric D. One terminal of the capacitive element C1 is connected to an AC signal source S and the other terminal P thereof is grounded via a resistor R and connected to a voltage detector DET. When an AC rectangular wave Sg (FIG. 3B) with a predetermined frequency (e.g. several kilohertz to several tens of kilohertz) is applied from the AC signal source S to the drive electrode E1 (one terminal of the capacitive element C1), an output waveform (detection signal Vdet) like that shown in FIG. 3A appears at the detection electrode E2 (the other terminal P of the capacitive element C1). This AC rectangular wave Sg is equivalent to a common drive signal Vcom to be described later.

In the state in which a finger is not in contact with the capacitive element C1, a current I0 depending on the capacitance value of the capacitive element C1 flows in association with charge/discharge of the capacitive element C1 as shown in FIGS. 1A and 1B. The potential waveform of the other terminal P of the capacitive element C1 at this time is e.g. a waveform V0 in FIG. 3A and it is detected by the voltage detector DET.

Figure 2B:
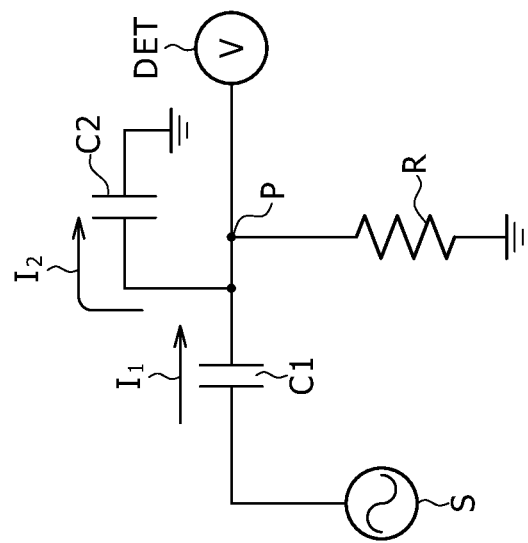
FIGS. 2A and 2B are diagrams for explaining the operation principle of the display device with the touch sensor and are diagrams showing the state when a finger is in contact.
Figure 2A:
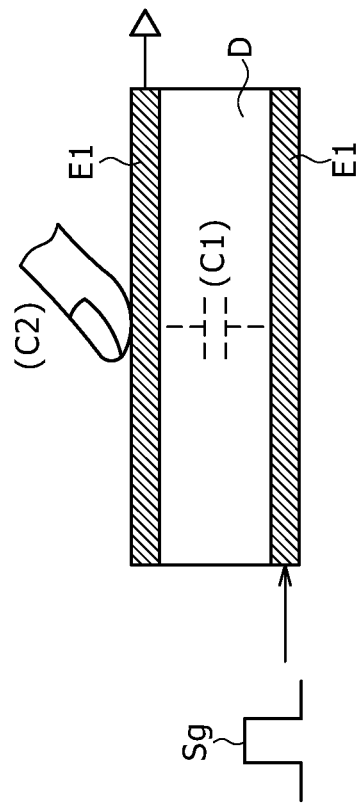

On the other hand, in the state in which a finger is in contact with the capacitive element C1, a form in which a capacitive element C2 formed by the finger is added in series to the capacitive element C1 is obtained as shown in FIGS. 2A and 2B. In this state, currents I1 and I2 flow in association with charge/discharge of the capacitive elements C1 and C2, respectively. The potential waveform of the other terminal P of the capacitive element C1 at this time is e.g. a waveform V1 in FIG. 3A and it is detected by the voltage detector DET. At this time, the potential of the node P is a voltage-divided potential determined by the values of the currents I1 and I2 flowing through the capacitive elements C1 and C2.

Therefore, the waveform V1 has a smaller value than the waveform V0 in the non-contact state. As described later, the voltage detector DET compares the detected voltage with a predetermined threshold voltage Vth. The voltage detector DET determines that the present state is the non-contact state if the detected voltage is equal to or lower than this threshold voltage and determines that the present state is the contact state if the detected voltage is higher than the threshold voltage. In this manner, touch detection is enabled.

FIG. 4 shows the sectional structure of the major part of the display device with the touch sensor. In this display device with the touch sensor, a liquid crystal display element is used as the display element and part of the electrode (common electrode 43 to be described later) originally provided in this liquid crystal display element and a display drive signal (common drive signal Vcom to be described later) are diverted to configure a capacitive touch sensor.

As shown in FIG. 4, this display device with the touch sensor includes a pixel substrate 2, an opposing substrate 4 that is so disposed as to be opposed to this pixel substrate 2, and a liquid crystal layer 6 interposed between the pixel substrate 2 and the opposing substrate 4. This pixel substrate 2 has a TFT substrate 21 as a circuit board and plural pixel electrodes 22 disposed in a matrix manner on this TFT substrate 21. In the TFT substrate 21, besides a display driver and thin film transistors (TFTs) (neither is shown) for driving the respective pixel electrodes 22, interconnects such as source lines to supply a pixel signal to the respective pixel electrodes and gate lines to drive the respective TFTs are formed.

The opposing substrate 4 has a glass substrate 41, a color filter 42 formed on one surface of this glass substrate 41, and the common electrode 43 formed on this color filter 42. The color filter 42 is configured by periodically arranging color filter layers of three colors of red (R), green (G), and blue (B) for example, and three colors of R, G, and B as one set are associated with each of the display pixels (pixel electrodes 22). The common electrode 43 is used also as a sensor drive electrode configuring part of the touch sensor that carries out touch detection operation and is equivalent to the drive electrode E1 in FIGS. 1A and 1B.

The common electrode 43 is connected to the TFT substrate 21 by a contact electrically-conductive pillar 7. The common drive signal Vcom having an AC rectangular waveform is applied from the TFT substrate 21 to the common electrode 43 via this contact electrically-conductive pillar 7. This common drive signal Vcom defines the display voltage of each pixel together with the pixel voltage applied to the pixel electrode 22. In addition, it is used also as the drive signal of the touch sensor and is equivalent to the AC rectangular wave Sg supplied from the drive signal source S in FIGS. 1A and 1B.

A sensor detection electrode 44 is formed on the other surface of the glass substrate 41. Furthermore, a polarizer 45 is disposed on this sensor detection electrode 44. The sensor detection electrode 44 configures part of the touch sensor and is equivalent to the detection electrode E2 in FIGS. 1A and 1B.

The liquid crystal layer 6 modulates light passing therethrough depending on the state of the electric field. For example, a liquid crystal of any of various kinds of modes such as the twisted nematic (TW) mode, the vertical alignment (VA) mode, and the electrically controlled birefringence (ECB) mode is used.

An alignment film is disposed between the liquid crystal layer 6 and the pixel substrate 2 and between the liquid crystal layer 6 and the opposing substrate 4. Furthermore, an incident-side polarizer is disposed on the lower surface side of the pixel substrate 2. However, diagrammatic representation of these components is omitted in the diagram.

FIG. 5 is a perspective view showing one configuration example of the common electrode 43 and the sensor detection electrode 44 in the opposing substrate 4. In this example, the common electrode 43 is divided into plural stripe-manner electrode patterns extending in the left-right direction of the diagram. The common drive signal Vcom is sequentially supplied to each electrode pattern by a driver 43D and line-sequential scan driving is performed in a time-division manner.

On the other hand, the sensor detection electrode 44 is composed of plural stripe-manner electrode patterns extending in the direction perpendicular to the extension direction of the electrode patterns of the common electrode 43. The detection signal Vdet is output from each of the respective electrode patterns of the sensor detection electrode 44 and is input to a detection circuit (not shown).

Next, the operation of the display device with the touch sensor having the above-described configuration will be described. The display driver (not shown) of the pixel substrate 2 line-sequentially supplies the common drive signal Vcom to the respective electrode patterns of the common electrode 43. Furthermore, the display driver supplies the pixel signal to the pixel electrodes 22 via the source lines and, in synchronization with this, line-sequentially controls switching of the TFTs of the respective pixel electrodes via the gate lines. Thereby, an electric field that is determined by the common drive signal Vcom and the pixel signal and is in the vertical direction (direction perpendicular to the substrate) is applied to the liquid crystal layer 6 on a pixel-by-pixel basis, so that the liquid crystal state is modulated. In this manner, displaying by so-called inversion driving is performed.

On the other hand, on the side of the opposing substrate 4, the capacitive element C1 is formed at each of the intersection parts of the respective electrode patterns of the common electrode 43 and the respective electrode patterns of the sensor detection electrode 44. When the common drive signal Vcom is sequentially applied to the respective electrode patterns of the common electrode 43 in a time-division manner, charge/discharge is performed for each of the capacitive elements C1 on one row formed at the intersection parts of the signal-applied electrode pattern of the common electrode 43 and the respective electrode patterns of the sensor detection electrode 44. As a result, the detection signal Vdet with the magnitude depending on the capacitance value of the capacitive element C1 is output from each of the respective electrode patterns of the sensor detection electrode 44. In the state in which a finger of the user is not in contact with the surface of the opposing substrate 4, the magnitude of this detection signal Vdet is almost constant. In association with scan of the common drive signal Vcom, the row of the capacitive element C1 as the subject of the charge/discharge line-sequentially moves.

If a finger of the user gets contact with any place on the surface of the opposing substrate 4, the capacitive element C2 by the finger is added to the capacitive element C1 originally formed at this touch place. As a result, the value of the detection signal Vdet at the timing when this touch place is scanned (i.e. when the common drive signal Vcom is applied to the electrode pattern corresponding to this touch place among the electrode patterns of the common electrode 43) is smaller than the value of the other places. The detection circuit compares this detection signal Vdet with the threshold voltage Vth, and determines that this place is the touch place if the detection signal Vdet is equal to or lower than the threshold voltage Vth. This touch place can be found out from the application timing of the common drive signal Vcom and the detection timing of the detection signal Vdet equal to or lower than the threshold voltage Vth.

As above, according to the present embodiment, a capacitive touch sensor is so configured that the common electrode 43 originally provided in the liquid crystal display element is used also as one of the pair of touch sensor electrodes composed of the drive electrode and the detection electrode and the common drive signal Vcom as the display drive signal is shared as the touch sensor drive signal. Therefore, it is enough that only the sensor detection electrode 44 is disposed as the newly provided electrode. Furthermore, the touch sensor drive signal does not need to be newly prepared.

By employing such a configuration, the configuration can be simplified. Furthermore, the sensor detection electrode 44 is divided into plural electrode patterns and the respective electrode patterns are individually driven in a time-division manner. Thus, detection of the touch position is also enabled.

The active-matrix liquid crystal display device functioning as the display device of the display device with the touch sensor shown in FIG. 4 and FIG. 5 as above has the scan (gate) lines disposed in a row manner, the signal lines disposed in a column manner, and the pixels disposed in a matrix manner corresponding to the intersection parts of the respective scan lines and signal lines. Furthermore, the active-matrix liquid crystal display device has a horizontal drive circuit that sets the elements on the row to the active state every one horizontal period (1H) and a vertical drive circuit that sequentially scans the scan line of the row in the active state to select and drive the pixels on a row-by-row basis (line-by-line basis).

Furthermore, the active-matrix liquid crystal display device writes the video signal of each horizontal period to the pixels on the respective selected rows to hold the video signal of one frame (or one field). While the liquid crystal display device functions as such a display device, it functions also as a touch panel as described above.

To use the common electrode 43 originally provided in the liquid crystal display element also as one of the pair of touch sensor electrodes composed of the drive electrode and the detection electrode and share the common drive signal Vcom as the display drive signal as the touch sensor drive signal, the magnitude of the amplitude of the common drive signal Vcom should satisfy the condition described below.

[Withstand Voltage]

Figure 6:
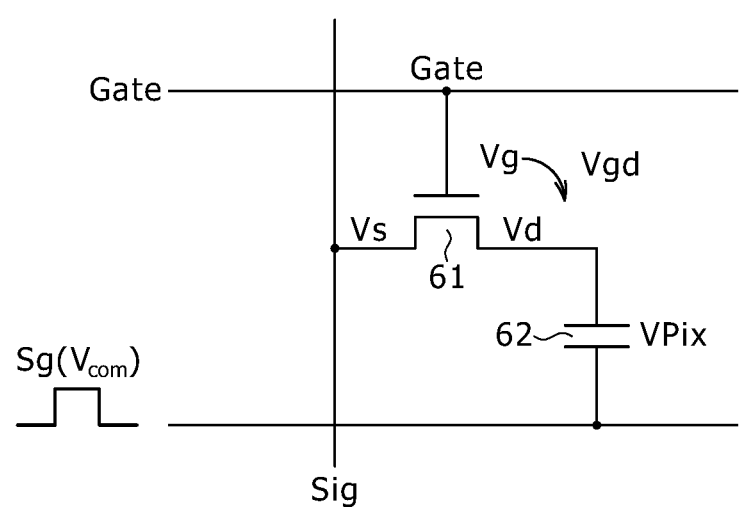
FIG. 6 is a diagram showing a configuration example of the pixel.

FIG. 6 is a block diagram showing the detailed configuration of one pixel (liquid crystal display element). The liquid crystal display element is composed of a TFT circuit 61 and liquid crystal capacitance 62. The gate electrode of the TFT circuit 61 is connected to the gate line. The source electrode (or signal electrode) of the TFT circuit 61 is connected to the signal line. The drain electrode of the TFT circuit 61 is connected to the liquid crystal capacitance 62. The common drive signal Vcom is applied to the opposing electrode of the liquid crystal capacitance 62 (electrode on the side that is not connected to the TFT circuit 61).

The TFT circuit 61 applies a voltage to the liquid crystal capacitance 62 to thereby drive the liquid crystal capacitance 62. Specifically, the TFT circuit 61 drives the liquid crystal capacitance 62 based on the signal voltage when the corresponding gate signal is ON.

The lifetime of the liquid crystal is shortened if a DC voltage is applied thereto. So, in the general liquid crystal display device, the voltage applied to the pixel electrode of the liquid crystal capacitance 62 is changed to the positive voltage side and the negative voltage side every certain time on the basis of the voltage applied to the common electrode. Thereby, the shortening of the lifetime of the liquid crystal is prevented.

As described later, in the present embodiment, the gate negative voltage is set floating in both of the positive voltage side (hereinafter, referred to as the positive polarity) and the negative voltage side (hereinafter, referred to as the negative polarity). This makes it possible to increase the amplitude of the common drive signal Vcom in order to enhance the accuracy of the touch sensor while carrying out control to prevent the TFT circuit from being broken.

The TFT circuit 61 has the withstand voltage under which the reliability is ensured. If a voltage equal to or higher than this standard voltage is applied to the TFT circuit 61, the TFT is broken to become non-functional as a semiconductor device. On the other hand, by increasing the amplitude (Tx amplitude) of the common drive signal Vcom, the electric field intensity greatly changes and the sensitivity as the touch sensor can be enhanced.

User needs for the touch sensor and user interface are also becoming more diverse. For example, it is desired that the following kinds of detection can also be performed: multi-touch detection to detect contact by plural fingers; detection of finger adjacency (so-called proximity); and detection by an ultra-fine pen. To perform such detection with high accuracy, the sensitivity of the touch sensor should be enhanced. To enhance the sensitivity, the amplitude (Tx amplitude) of the common drive signal Vcom should be increased.

However, if merely the amplitude of the common drive signal Vcom is increased, possibly the applied voltage surpasses the withstand voltage of the above-described TFT circuit 61. The potential difference Vgd between the gate potential Vg and the drain potential (pixel potential) Vd of the TFT circuit 61 is obtained as follows from the potential Vpix of the liquid crystal capacitance 62, the potential Vcom of the amplitude of the common drive signal Vcom, and the potential Gate of the power supply of the gate.

potential difference $Vgd$=potential $Vpix$+potential $Vcom$−potential Gate

For example, suppose that the withstand potential of the TFT circuit 61 is 7 and potential Vpix=1, potential Vcom=2, and potential Gate=−3. In this case, the potential difference Vgd is 6 from the above expression. In the case of the potential difference Vgd=6, because it is smaller than the value of the withstand voltage, i.e. 7, the TFT circuit 61 operates in the range under the withstand voltage under which the reliability is ensured.

However, if the amplitude of the common drive signal Vcom is increased to set the double potential Vcom=4 in order to enhance the sensitivity of the touch sensor, the potential difference Vgd becomes 8. In the case of the potential difference Vgd=8, because it is larger than the value of the withstand voltage, i.e. 7, the TFT circuit 61 operates outside the range under the withstand voltage under which the reliability is ensured and possibly breakdown and so forth occur. Thus, the amplitude of the common drive signal Vcom cannot be set to such a potential.

Further explanation will be added to this respect. As described above, the pixel electrode is given both the negative polarity and the positive polarity. It is when the pixel electrode is given the positive polarity that possibly the applied voltage surpasses the withstand voltage of the TFT circuit 61 when the amplitude of the common drive signal Vcom is increased. This fact will be explained with reference to FIGS. 7A and 7B.

FIG. 7A is a diagram showing the potential relationship when the liquid crystal is given the negative polarity and FIG. 7B is a diagram showing the potential relationship when the liquid crystal is given the positive polarity. In FIG. 7A and FIG. 7B, the potential Gate applied to the gate of the TFT circuit 61 is shown by a solid line. Furthermore, the potential Vcom of the common drive signal Vcom is shown by a dotted line and the potential Vpix applied to the liquid crystal capacitance 62 is shown by a one-dot chain line.

Referring to FIG. 7A, when the gate signal of the TFT circuit 61 is switched from a potential GateA to a potential GateB and thereby the TFT circuit 61 is turned on, the potential Vpix of a negative voltage is applied in the case of the negative polarity. The potential GateA is defined as the potential serving as the basis and the potential GateB is defined as the potential necessary to turn on the TFT circuit 61. If this applied potential Vpix is defined as a potential VpixA, the relationship between the potential GateB and the potential VpixA is as shown in FIG. 7A.

If a potential VcomB of the common drive signal Vcom is applied when the potential of the liquid crystal capacitance 62 is the potential VpixA, the potential of the liquid crystal capacitance 62 rises by the amount equivalent to the amount of potential rise of the common drive signal Vcom to become a potential VpixB. At this time, the potential difference between the potential VpixB and the potential GateA, i.e. the potential difference Vgd, is smaller than the withstand voltage. Thus, the TFT circuit 61 is not broken.

Referring to FIG. 7B, when the gate signal of the TFT circuit 61 is switched from the potential GateA to the potential GateB and thereby the TFT circuit 61 is turned on, the potential Vpix of a positive voltage is applied in the case of the positive polarity. If this applied potential Vpix is defined as a potential VpixC, the relationship between the potential GateB and the potential VpixC is as shown in FIG. 7B.

If the potential VcomB of the common drive signal Vcom is applied when the potential of the liquid crystal capacitance 62 is the potential VpixC, the potential of the liquid crystal capacitance 62 rises by the amount equivalent to the amount of potential rise of the common drive signal Vcom to become a potential VpixD. Although the potential VcomB is the same potential as that in the case of the negative polarity, the potential of the liquid crystal capacitance 62 becomes a different potential and becomes the potential VpixD higher than the potential in the case of the negative polarity. The potential difference between this potential VpixD and the potential GateA, i.e. the potential difference Vgd, is larger than that in the case of the negative polarity and possibly is larger than the withstand voltage. Thus, there is a possibility of breakdown of the TFT circuit 61 and so forth and the state is not a preferable state.

As above, if the amplitude of the common drive signal Vcom is increased, possibly the applied voltage surpasses the withstand voltage of the TFT circuit 61 in the case of the positive polarity although such design that the TFT circuit 61 operates in the range under the withstand voltage in the case of the negative polarity is employed. Therefore, it is difficult to increase the amplitude of the common drive signal Vcom. So, as shown in FIGS. 8A and 8B, the potential Gate applied to the gate of the TFT circuit 61 is switched to the floating state in both the cases of the positive polarity and the negative polarity so that the applied voltage may be prevented from surpassing the withstand voltage of the TFT circuit 61 and the amplitude of the common drive signal Vcom can be increased.

The potential relationship in the case of the negative polarity shown in FIG. 8A is different from the potential relationship in the case of the negative polarity shown in FIG. 7A in that the potential applied to the gate of the TFT circuit 61 is set floating when the potential Vpix of the negative voltage is applied after the gate signal of the TFT circuit 61 is switched from the potential GateA to the potential GateB and thereby the TFT circuit 61 is turned on.

If the potential VcomB of the common drive signal Vcom is applied when the potential of the liquid crystal capacitance 62 is the potential VpixA, the potential of the liquid crystal capacitance 62 rises by the amount equivalent to the amount of potential rise of the common drive signal Vcom to become the potential VpixB. Furthermore, because the potential of the gate is set floating, the potential of the gate becomes a potential GateC. This potential GateC is a potential satisfying a relationship of potential GateA<potential GateC<potential GateB. Due to the setting of the gate potential to the floating state, the potential difference Vgd becomes the potential difference between the potential VpixB and the potential GateC and thus can be made to fall within the range under the withstand voltage. Therefore, the TFT circuit 61 is not broken.

Although the explanation will be continued based on the assumption that the gate potential is set to the floating state even in the case of the negative polarity, it is also possible to employ a configuration in which the gate potential is not set to the floating state in the case of the negative polarity because the possibility that the applied voltage surpasses the withstand voltage of the TFT circuit 61 is low even when the gate potential is not set to the floating state as described with reference to FIG. 7A.

Next, the case of the positive polarity will be described with reference to FIG. 8B. Also in the case of the positive polarity, a potential relationship like that shown in FIG. 8B is obtained due to setting of the gate potential to the floating state as with the case of the negative polarity. Also in the case shown in this FIG. 8B, the common drive signal Vcom and the potential VpixC are applied to the TFT circuit 61 as with the case shown in FIG. 7B. However, differently from the case shown in FIG. 7B, the potential Gate applied to the gate of the TFT circuit 61 is set floating. Thus, the gate potential changes as follows.

potential GateA→potential GateB→potential GateC

This change is the same as that in the case of the negative polarity. However, possibly the potential GateC is not the same between the cases of the positive polarity and the negative polarity in some cases.

Also in the case of the positive polarity, the potential of the gate changes in this manner and therefore the potential difference Vgd is the potential difference between the potential VpixD and the potential GateC and thus can be made to fall within the range under the withstand voltage. Therefore, the TFT circuit 61 is not broken.

As above, the potential VpixC of the positive voltage is applied to the TFT circuit 61 in the case of the positive polarity. If the potential VcomB is applied by the common drive signal Vcom when the potential of the liquid crystal capacitance 62 is the potential VpixC, the potential of the liquid crystal capacitance 62 rises by the amount equivalent to the amount of potential rise of the common drive signal Vcom to become the potential VpixD. Furthermore, because the potential of the gate is set floating, the potential of the gate is subjected to coupling by the amplitude of the common drive signal Vcom to become the potential GateC.

At this time, in the example shown in FIG. 7B, there is a possibility that the potential difference Vgd between the potential VpixD and the potential GateA (defined as the potential difference VgdDA) is larger than the withstand voltage. However, in the example shown in FIG. 8B, the potential difference Vgd between the potential VpixD and the potential GateC (defined as the potential difference VgdDC) is smaller than the potential difference VgdDA and thus can be made to fall within the range under the withstand voltage.

As above, the potential Gate is set floating in order to prevent the potential difference between the potential Gate and the pixel potential subjected to coupling by the amplitude of the common drive signal Vcom from becoming equal to or larger than the withstand voltage standard. Thereby, not only the pixel potential but also the potential Gate is subjected to the coupling with the potential of the common drive signal Vcom and thus the withstand voltage standard can be satisfied.

However, the potential of the negative polarity pixel leaks if the coupling is too large and the withstand voltage standard of the positive polarity pixel is not satisfied if the coupling is too small. Therefore, the amplitude of the common drive signal Vcom should be limited to such amplitude as to satisfy them. However, although there is such limitation, the amplitude of the common drive signal Vcom can be increased and the accuracy of the touch sensor can be enhanced as described above.

As above, irrespective of whether the polarity is the negative polarity or the positive polarity, such a signal voltage that three potentials appear is applied to the gate of the TFT circuit 61. One potential among them is the potential subjected to coupling by the common drive signal Vcom due to setting to the floating state.

[Polarity Arrangement Pattern of Pixels]

Figure 9B:
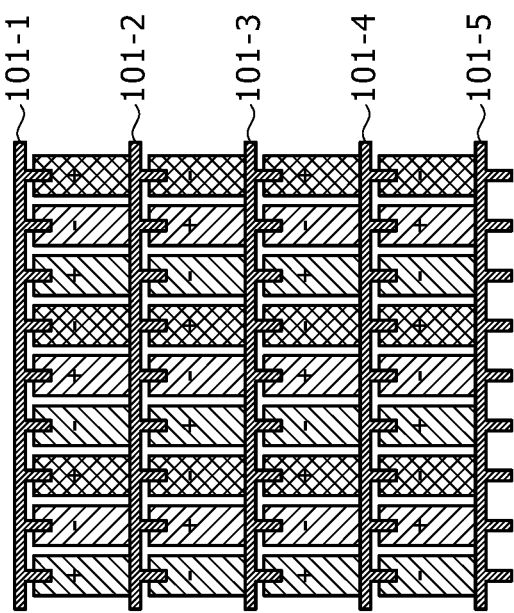
FIGS. 9A and 9B are diagrams for explaining arrangement of gate lines.
Figure 9A:
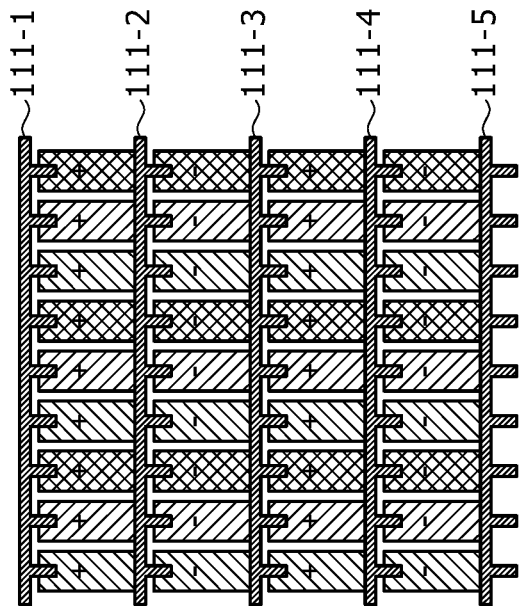

FIGS. 9A and 9B are diagrams for explaining the polarity arrangement pattern of the pixels and the connection pattern of the gate lines. The polarity arrangement pattern shown in FIG. 9A is referred to as the dot inversion driving and is a pattern in which positive pixels and negative pixels are disposed in a staggered manner. In the dot inversion driving, for example, the upper, lower, left, and right adjacent pixels of a positive pixel at an arbitrary place are negative pixels. Similarly, the upper, lower, left, and right adjacent pixels of a negative pixel are positive pixels.

As shown in FIG. 9A, if the same gate signal is used for the negative polarity and the positive polarity, in other words, if the potential of the gate is set to the floating state for the negative polarity and the positive polarity when the display device functions as a touch sensor, the same gate signal is supplied to both the pixels of the negative polarity and the positive polarity.

Thus, for example, a gate line 101-1 is connected to both of the negative polarity pixels and the positive polarity pixels disposed on one horizontal row on the upper side of the diagram and supplies the gate signal. Similarly, a gate line 101-2 is connected to both of the negative polarity pixels and the positive polarity pixels disposed on one horizontal row as the second row from the upper side of the diagram and supplies the gate signal.

In this manner, the same gate signal is used for the negative polarity and the positive polarity. Thus, the gate line can be connected irrespective of the negative polarity pixel and the positive polarity pixel. The present embodiment can be applied also to a system other than such a dot inversion driving system. For example, the present embodiment can be applied also to a line inversion driving system shown in FIG. 9B.

In the line inversion driving system, for example, the left and right adjacent pixels of a positive pixel at an arbitrary place are positive pixels. Similarly, the left and right adjacent pixels of a negative pixel are negative pixels. That is, all pixels on one line are positive or negative pixels and positive pixels and negative pixels are alternately disposed on each one line basis. As shown in FIG. 9B, the pixels of the negative polarity or the positive polarity are disposed on one line. On this one line, the pixels are connected to the same gate line and supplied with the gate signal.

Thus, for example, a gate line 111-1 is connected to the positive polarity pixels disposed on one horizontal row on the upper side of the diagram and supplies the gate signal. Similarly, a gate line 111-2 is connected to the negative polarity pixels disposed on one horizontal row as the second row from the upper side of the diagram and supplies the gate signal.

As above, if the same gate signal is used for the negative polarity and the positive polarity, the gate line is disposed into a straight line shape and connected to the pixels disposed into a straight line shape similarly.

[Configuration of Gate Buffer]

Figure 10A:
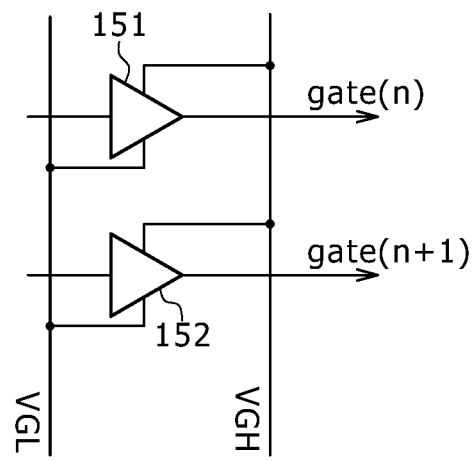
FIGS. 10A and 10B are diagrams showing a configuration example of a gate buffer.
Figure 10B:
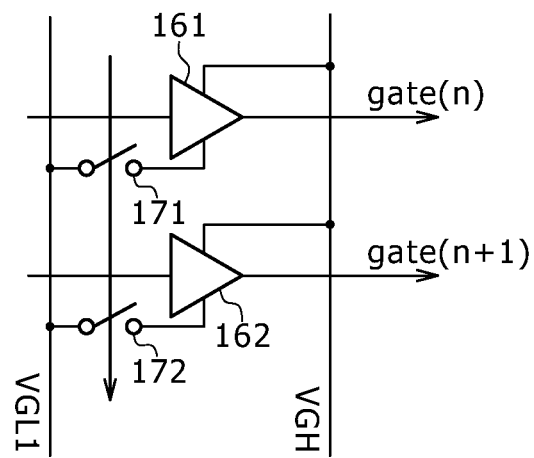

FIGS. 10A and 10B are diagrams showing the configuration of a gate buffer. In FIG. 10A, the configuration of a related-art gate buffer used when the gate potential is not set floating is shown for comparison. In FIG. 10B, the configuration of a gate buffer used when the gate potential is set floating is shown.

Referring to FIG. 10A, a buffer 151 and a buffer 152 are each connected to a VGL line that outputs a signal of the potential equivalent to the potential GateA and a VGH line that outputs a signal of the potential equivalent to the potential GateB. The buffer 151 and the buffer 152 each perform switching between the signal supplied from the VGL line and the signal supplied from the VGH line and outputs the signal to the connected gate line at predetermined timing based on an instruction from the external (not shown).

The buffer 151 is connected to the gate line (n) and the buffer 152 is connected to the gate line (n+1). For example, if the buffer 151 is connected to the gate line 101-1 (FIG. 9A), the buffer 152 is connected to the gate line 101-2 (FIG. 9A). Although two buffers are shown in FIG. 10A, buffers whose number corresponds to the number of gate lines are provided.

In contrast to such a configuration of the gate buffer, when the gate potential is set floating, the configuration of the gate buffer is as shown in FIG. 10B. In the configuration of the gate buffer shown in FIG. 10B, two buffers 161 and 162 are shown as with the configuration of the gate buffer shown in FIG. 10A. They are two buffers shown for explanation among the provided buffers whose number corresponds to the number of gate lines.

The buffer 161 and the buffer 162 are the same as the buffer 151 and the buffer 152 shown in FIG. 10A in that each of them is connected to the VGH line that outputs the signal of the potential equivalent to the potential GateB. However, they are different from the buffer 151 and the buffer 152 shown in FIG. 10A in that the buffer 161 and the buffer 162 are connected to a VGL1 line that outputs a signal of the potential equivalent to the potential GateA via a switch 171 and a switch 172, respectively, or are not connected (set to the floating state).

The buffer 161 and the buffer 162 each perform switching among the state in which the signal supplied from the VGL1 line is output, the state in which the signal supplied from the VGH line is output, and the floating state at predetermined timing based on an instruction from the external (not shown). Furthermore, the switch 171 and the switch 172 also each perform switching between connection to the VGL1 line and open at predetermined timing based on an instruction from the external (not shown). When being connected to the VGL1 line, the switch 171 and the switch 172 supply the signal from the VGL1 line to the buffer 161 and the buffer 162, respectively.

The buffer 161 is connected to the gate line (n) and the buffer 162 is connected to the gate line (n+1). For example, if the buffer 161 is connected to the gate line 101-1 (FIG. 9A), the buffer 162 is connected to the gate line 101-2 (FIG. 9A).

For example, when the switch 171 is connected, the signal of the potential equivalent to the potential GateA is supplied from the VGL1 line to the buffer 161. When the switch 171 is opened, the buffer 161 is set to the potential floating state.

By employing the configuration in which the switch is provided to allow switching of on/off of connection to the VGL1 line in this manner, the floating state and the non-floating state can be made.

[Explanation with Reference to Timing Chart]

With reference to timing charts, explanation will be made about the technique of ensuring the voltage endurance of the TFT circuit 61 by setting the gate potential to the floating state when the display device functions as a touch sensor.

As described above, as writing when the display device with a touch sensor functions as the display device, writing on the positive and negative sides is performed and AC inversion is carried out in order to prevent the occurrence of charge bias. In general, the potential difference Vgd becomes the largest in the pixel TFT (TFT circuit 61) in the period in which the pixel potential obtained by writing the positive polarity is held.

Therefore, as described above, the gate potential of the pixel TFT is floating-controlled to such a potential (potential GateC) that the potential difference Vgd does not surpasses the predetermined standard in the pixel to which wiring on the positive polarity side is performed and the pixel potential does not leak. Such floating control makes it possible to increase the amplitude of the common drive signal Vcom. Furthermore, by similarly carrying out the floating control of the gate potential of the pixel TFT for the pixel to which wiring on the negative polarity side is performed, the amplitude of the common drive signal Vcom can be increased.

In this case, by controlling, specifically floating-controlling, the potential to the above-described potential GateC for allowing the display device to function as a touch sensor in the vertical blanking period (V blank) and the horizontal blanking period (H blank) as the time that is not the writing period, control with avoidance of the occurrence of leakage attributed to image data is enabled. It is desirable that the Sig potential be a constant potential free from leakage.

Figure 11:
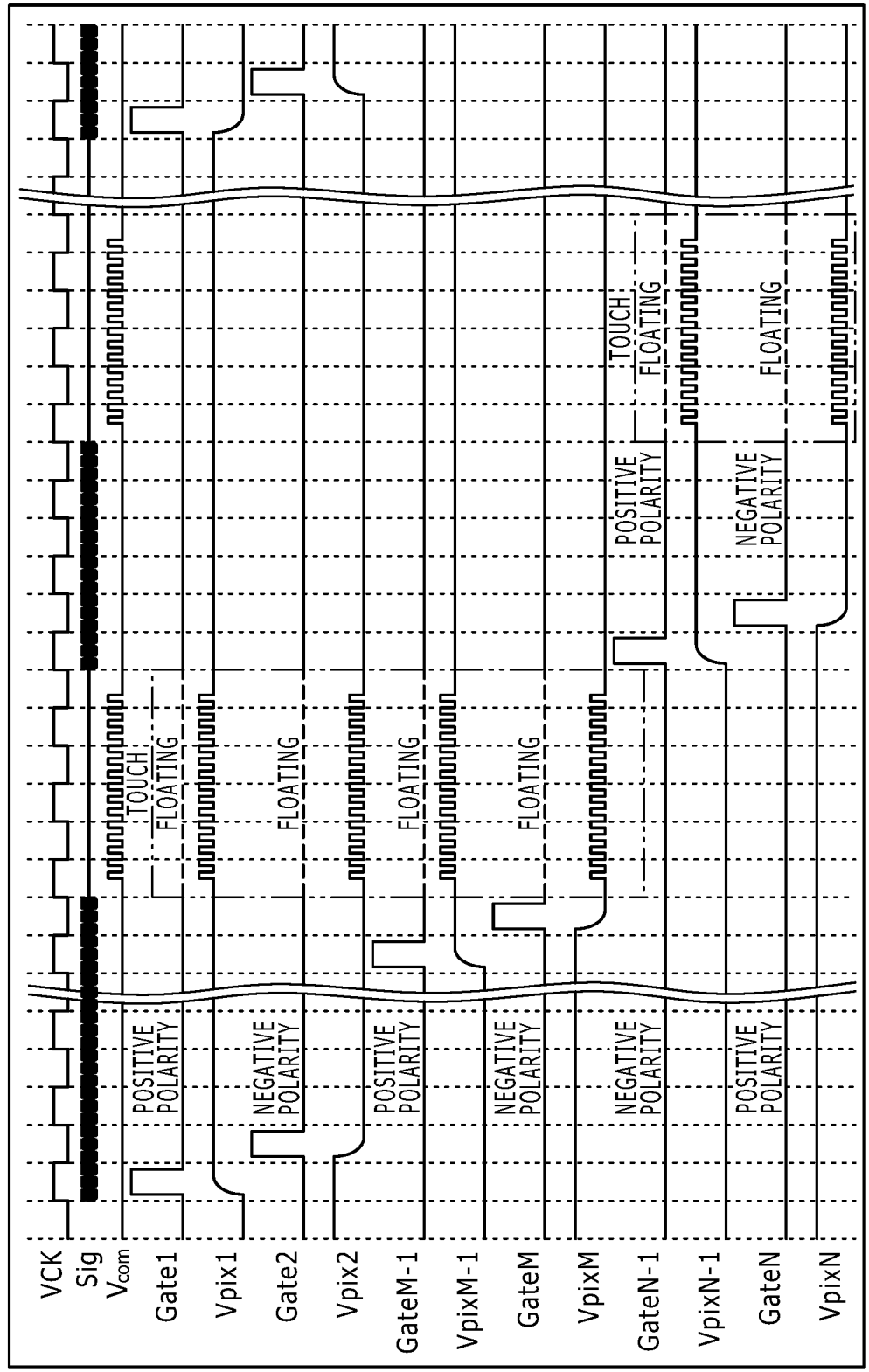
FIG. 11 is a timing chart for explaining the potential relationship in a blanking period.
Figure 12:
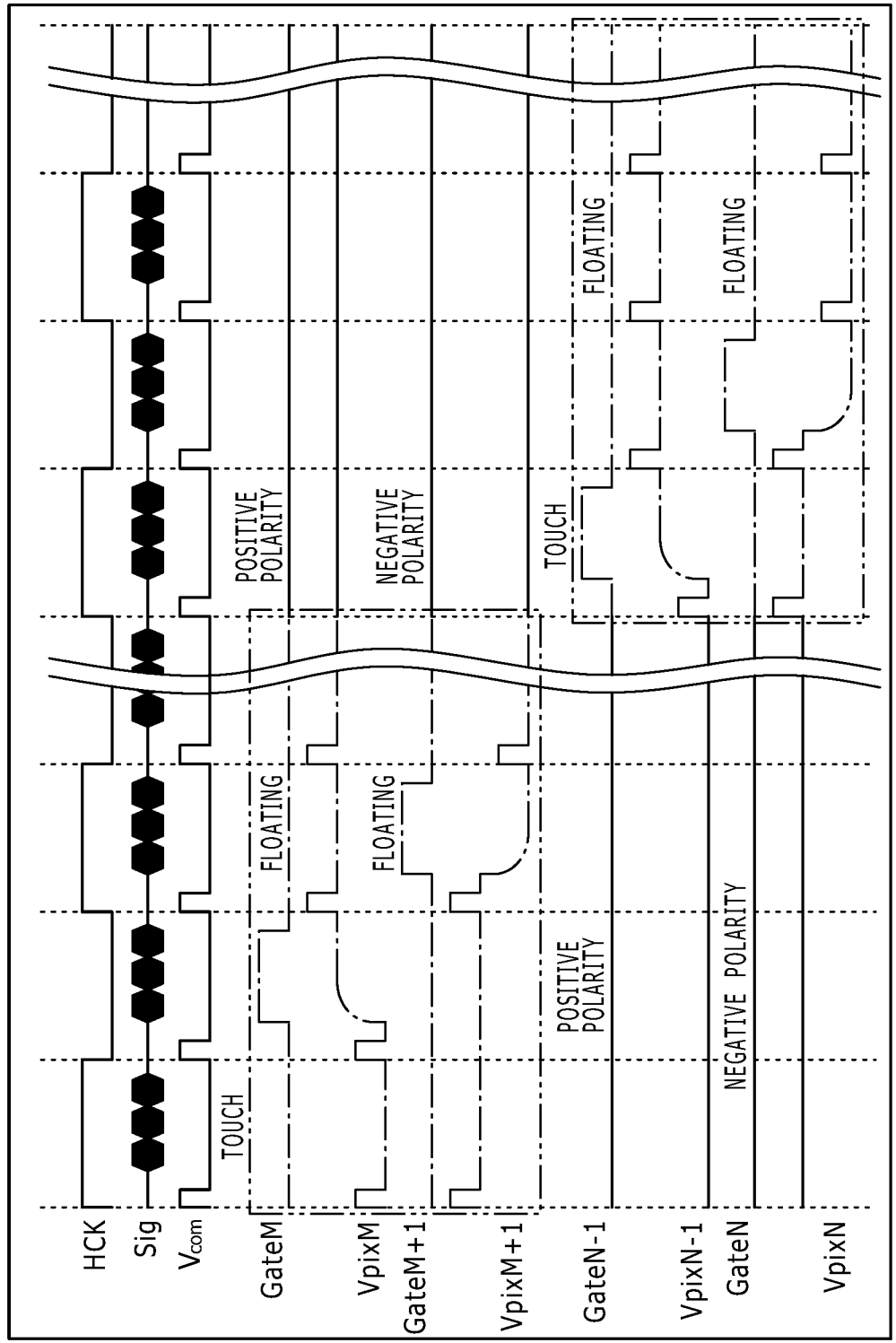
FIG. 12 is a timing chart for explaining the potential relationship in a blanking period.

The display device with the touch sensor functions as the touch sensor by utilizing the vertical blanking period and the horizontal blanking period. In each of the vertical blanking period and the horizontal blanking period, raising of the gate negative voltage of the pixel is performed by setting the potential to the floating state. FIG. 11 shows a timing chart in the case of the vertical blanking period and FIG. 12 shows a timing chart in the case of the horizontal blanking period.

Referring to FIG. 11, VCK denotes a vertical synchronizing signal and Sig denotes a video signal. Vcom, Gate1 to GateN, and Vpix1 to VpixN denote the above-described potential Vcom, potential Gate, and potential Vpix, respectively. Furthermore, Gate1 to GateN denote the potential of the output signal from the buffer connected to the gate lines 1 to N, respectively, and Vpix1 to VpixN denote the potential of the liquid crystal capacitance C connected to the gate lines 1 to N, respectively. Vcom, Gate1 to GateN, and Vpix1 to VpixN each satisfy the potential relationship described with reference to FIGS. 8A and 8B.

The common drive signal Vcom is a signal with a predetermined cycle and a signal that repeatedly takes the potential VcomA and the potential VcomB during the vertical blanking period, and is sequentially supplied to the respective pixels. Suppose that Gate1 is the potential of the gate line 1 connected to a pixel of the positive polarity. In this case, at the timing shown in FIG. 11, the positive polarity pixel connected to the gate line 1 is turned on through switching of Gate1 from the potential GateA to the potential GateB and writing is performed based on the video signal. The potential Vpix1 is kept at the potential VpixC after the writing is performed.

If the vertical blanking period starts when the potential Vpix1 of the liquid crystal capacitance C is kept at the potential VpixC and the common drive signal Vcom that repeatedly takes the potential VcomA and the potential VcomB at a predetermined cycle is applied, the potential Vpix1 of the liquid crystal capacitance C becomes a signal that repeatedly takes the potential VpixC and the potential VpixD corresponding to this cycle. During the period in which the potential Vpix1 of the liquid crystal capacitance C of the positive polarity pixel varies in this manner, i.e. during the vertical blanking period in this case, the potential of Gate1 is set to the floating state.

In FIG. 11, the diagrammatic representation is made as if the potential of Gate1 were fixed at the potential GateA during the vertical blanking period. However, the potential of Gate1 in the floating state is the potential subjected to coupling by the amplitude of the common drive signal Vcom and therefore is not fixed at the potential GateA. In FIG. 11, the potential of Gate1 during setting to the floating state is shown by a dotted line in order to indicate that it is the potential subjected to coupling by the amplitude of the common drive signal Vcom.

Also in the case of the negative polarity, the potential of the gate is set to the floating state during the vertical blanking period as with the case of the positive polarity. For example, the potential of Gate2 is set to the potential subjected to coupling by the amplitude of the common drive signal Vcom.

At the time before the vertical blanking period, the switch 171 (FIG. 10B) of the gate buffer 161 is set to the connected state and the gate buffer 161 outputs the signal of the potential GateA supplied via the VGL1 line. Then, upon the start of the vertical blanking period, the switch 171 is switched to the open state and the gate buffer 161 is set to the floating state. Then, upon the end of the vertical blanking period, the switch 171 is connected again to be set to such a state as to supply the signal of the potential GateA supplied via the VGL1 line to the gate buffer 161. This operation is repeated.

In this manner, during the vertical blanking period, the potential of the gate is set to the floating state and is so controlled as to become the potential subjected to coupling by the amplitude of the common drive signal Vcom. Thus, as described with reference to FIGS. 8A and 8B, control can be carried out in such a manner that the applied voltage does not surpass the withstand voltage of the TFT circuit 61 although the potential Vpix1 of the liquid crystal capacitance C varies between the potential VpixC and the potential VpixD.

Furthermore, by keeping the gate negative voltage at the floating state during the blanking period, in which the display device functions as the touch sensor, the amplitude of the common drive signal Vcom supplied during the blanking period can be increased (potential difference between the potential VcomA and the potential VcomB can be increased) and the performance as the touch sensor can be enhanced.

FIG. 12 is a timing chart for explaining change in the potential in the horizontal blanking period. Also in the horizontal blanking period, basically the potential change is the same as that in the above-described vertical blanking period.

Referring to FIG. 12, HCK denotes a horizontal synchronizing signal and Sig denotes a video signal. Vcom, GateM to GateN, and VpixM to VpixN denote the above-described potential Vcom, potential Gate, and potential Vpix, respectively. Furthermore, GateM to GateN denote the potential of the output signal from the buffer connected to the gate lines M to N, respectively, and VpixM to VpixN denote the potential of the liquid crystal capacitance C connected to the gate lines M to N, respectively. Vcom, Gate1 to GateN, and Vpix1 to VpixN each satisfy the potential relationship described with reference to FIGS. 8A and 8B.

At the timing shown in FIG. 12, the positive polarity pixel connected to the gate line M is turned on through switching of the potential of GateM from the potential GateA to the potential GateB and writing is performed based on the video signal. The potential VpixM keeps the potential VpixC after the writing. GateM of the positive polarity pixel is set to the floating state during the horizontal blanking period, in which the display device functions as the touch sensor, and is set to a state that is not the floating state during the period other than it.

Similarly, at the timing shown in FIG. 12, the negative polarity pixel connected to the gate line M+1 is turned on through switching of the potential of GateM+1 from the potential GateA to the potential GateB and writing is performed based on the video signal. The potential VpixM+1 keeps the potential VpixA after the writing. GateM+1 of the negative polarity pixel is set to the floating state during the horizontal blanking period, in which the display device functions as the touch sensor, and is set to a state that is not the floating state during the period other than it.

As with FIG. 11, also in FIG. 12, the potential of the gate during setting to the floating state is the potential subjected to coupling by the amplitude of the common drive signal Vcom and such a potential is shown by a dotted line.

As above, in the period in which the TFT circuit 61 is turned on, of the period in which the display device functions as the touch sensor, the gate potential is set to the potential GateB. In the period that is other than it and is not the horizontal blanking period, the gate potential is set to the potential GateA. In the horizontal blanking period, the gate potential is set to the floating state and set to the potential subjected to coupling by the amplitude of the common drive signal Vcom.

Also in this case, the potential applied to the gate can be set to the potential subjected to coupling by the amplitude of the common drive signal Vcom during the horizontal blanking period. Thus, as described with reference to FIGS. 8A and 8B, although the potential VpixM of the liquid crystal capacitance C varies between the potential VpixC and the potential VpixD, the negative voltage of the gate is raised in association with this variation as a result. Therefore, control can be carried out in such a manner that the applied voltage does not surpasses the withstand voltage of the TFT circuit 61.

Furthermore, because the gate negative voltage can be raised during the horizontal blanking period, in which the display device functions as the touch sensor, the amplitude of the common drive signal Vcom supplied during the horizontal blanking period can be increased (potential difference between the potential VcomA and the potential VcomB can be increased) and the performance as the sensor can be enhanced.

The gate potential may be set to the floating state during the blanking period as described above. Alternatively, the gate potential may be set to the floating state between the blanking periods and in synchronization with the amplitude of the common drive signal Vcom.

[Effects]

As above, according to the embodiment of the present technique, the gate negative voltage can be raised by setting the gate potential to the floating state when the display device with the touch sensor functions as the touch sensor. Thus, the applied voltage can be prevented from surpassing the withstand voltage of the TFT circuit. Furthermore, because the gate negative voltage can be raised, the potential of the common drive signal Vcom can be increased by the amount of this potential raising (or larger) and the increased potential can be applied to the TFT circuit. Thus, the amplitude of the common drive signal Vcom can be increased, which can enhance the performance as the touch sensor.

Furthermore, by setting such a period in which the gate negative voltage is raised (period in which the gate potential is set to the floating state) in the vertical blanking period and the horizontal blanking period, which are not the period of writing to the pixel, the occurrence of leakage attributed to image data can be prevented.

Moreover, the parasitic capacitance between the common drive signal Vcom and the Gate line disappears and thus the switching speed (time constant) of the common drive signal Vcom can be improved.

[Recording Medium]

The above-described series of processing can be executed by hardware and can also be executed by software. In the case of executing the series of processing by software, the program configuring the software is installed in a computer. The computer includes a computer incorporated in dedicated hardware, e.g. a general-purpose personal computer capable of carrying out various kinds of functions through installation of various kinds of programs, and so forth.

Figure 13:
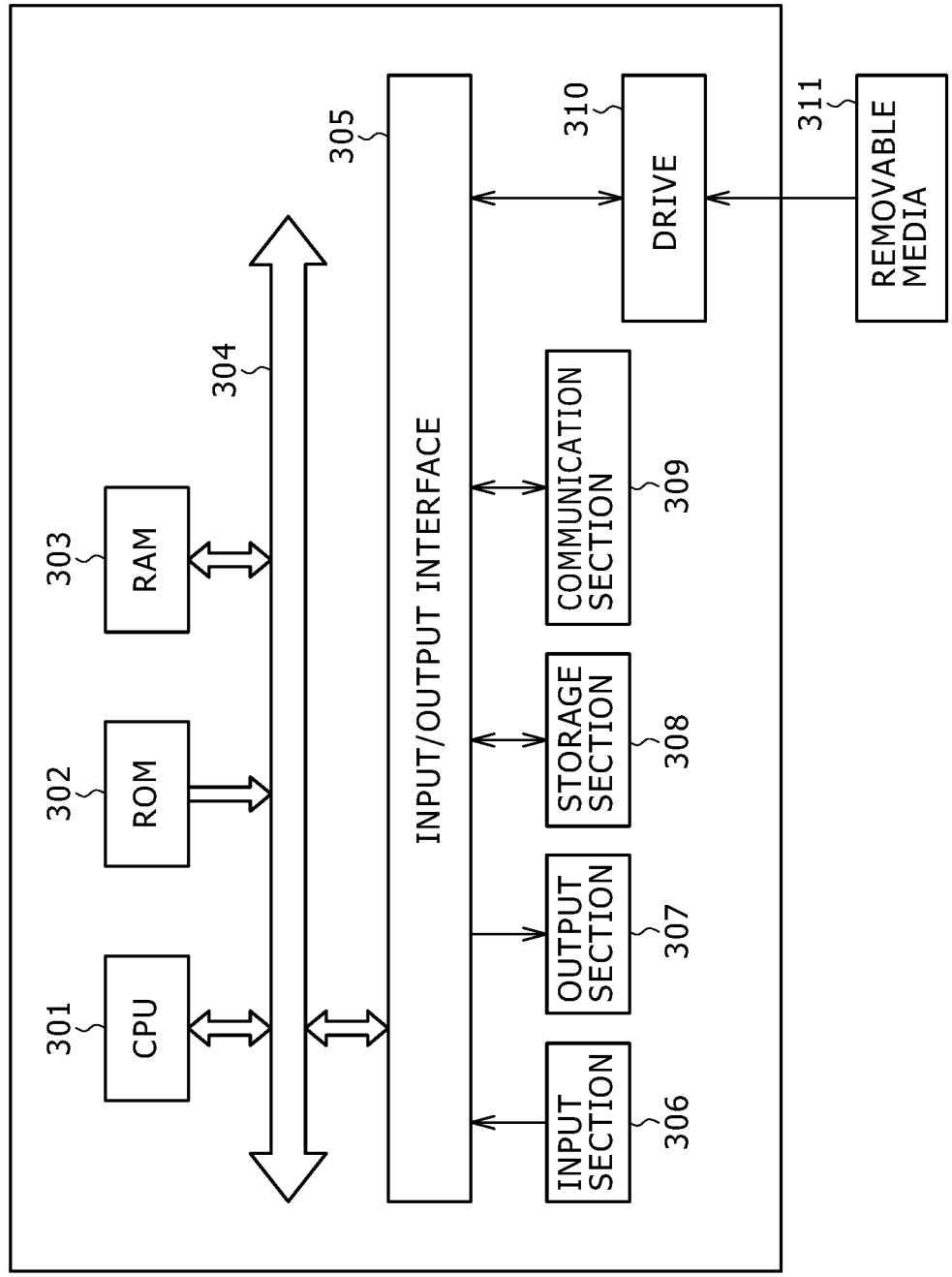
FIG. 13 is a diagram for explaining a recording medium.

FIG. 13 is a block diagram showing a configuration example of the hardware of the computer that executes the above-described series of processing by a program. In the computer, a central processing unit (CPU) 301, a read only memory (ROM) 302, and a random access memory (RAM) 303 are connected to each other by a bus 304. An input/output interface 305 is connected to the bus 304. To the input/output interface 305, an input section 306, an output section 307, a storage section 308, a communication section 309, and a drive 310 are connected.

The input section 306 is formed of keyboard, mouse, microphone, etc. The output section 307 is formed of display, speaker, etc. The storage section 308 is formed of hard disc, non-volatile memory, etc. The communication section 309 is formed of a network interface etc. The drive 310 drives removable media 311 such as a magnetic disk, an optical disk, a magneto-optical disk, or a semiconductor memory.

In the computer configured in the above-described manner, the CPU 301 loads a program stored in the storage section 308 into the RAM 303 via the input/output interface 305 and the bus 304 and runs it for example, and thereby the above-described series of processing is executed.

The program run by the computer (CPU 301) can be recorded in the removable media 311 as package media or so forth and be provided for example. Furthermore, the program can be provided via a wired or wireless transmission medium such as a local area network, the Internet, or digital satellite broadcast.

In the computer, the program can be installed into the storage section 308 via the input/output interface 305 by loading the removable media 311 in the drive 310. Furthermore, the program can be received by the communication section 309 via a wired or wireless transmission medium and be installed into the storage section 308. Besides, the program can be installed in the ROM 302 or the storage section 308 in advance.

The program run by the computer may be a program processed in a time-series manner along the order explained in the present specification or may be a program processed in parallel or at the necessary timing such as when calling is performed.

Furthermore, in the present specification, the term "system" refers to the whole of a device configured by plural devices.

Embodiments of the present technique are not limited to the above-described embodiment and various changes can be made without departing from the gist of the present technique.

The present technique can also employ the following configurations.

(1) A display device with a touch sensor, including
a plurality of display pixel electrodes,
a common electrode configured to be provided opposed to the display pixel electrodes,
a display function layer configured to have an image display function,
a display control circuit configured to apply a display voltage between the display pixel electrodes and the common electrode based on an image signal and carry out image display control so that the display function of the display function layer be exerted, and
a touch detection electrode configured to be provided opposed to the common electrode and form capacitance between the touch detection electrode and the common electrode,
wherein
a display drive voltage applied to the common electrode by the display control circuit is utilized as a touch sensor drive signal, and
potential of a gate of a TFT circuit connected to the display pixel electrode is set to a floating state during application of the touch sensor drive signal.

(2) The display device with a touch sensor according to the above-described (1), wherein
the potential of the gate is set to the floating state during a vertical blanking period and a horizontal blanking period.

(3) The display device with a touch sensor according to the above-described (1) or (2), wherein
the potential of the gate is set to the floating state so as to become a potential subjected to coupling by the touch sensor drive signal.

(4) A potential control method of a display device with a touch sensor, the display device including
a plurality of display pixel electrodes,
a common electrode provided opposed to the display pixel electrodes,
a display function layer having an image display function,
a display control circuit that applies a display voltage between the display pixel electrodes and the common electrode based on an image signal and carries out image display control so that the display function of the display function layer be exerted, and
a touch detection electrode that is provided opposed to or in juxtaposition with the common electrode and forms capacitance between the touch detection electrode and the common electrode,
the potential control method including
utilizing a display drive voltage applied to the common electrode by the display control circuit as a touch sensor drive signal, and
setting potential of a gate of a TFT circuit connected to the display pixel electrode to a floating state during application of the touch sensor drive signal.

(5) A program for causing a computer that controls a display device with a touch sensor to execute processing, the display device including
a plurality of display pixel electrodes,
a common electrode provided opposed to the display pixel electrodes,
a display function layer having an image display function,
a display control circuit that applies a display voltage between the display pixel electrodes and the common electrode based on an image signal and carries out image display control so that the display function of the display function layer be exerted, and
a touch detection electrode that is provided opposed to the common electrode and forms capacitance between the touch detection electrode and the common electrode,
the processing being executed for carrying out a process including
utilizing a display drive voltage applied to the common electrode by the display control circuit as a touch sensor drive signal, and
setting potential of a gate of a TFT circuit connected to the display pixel electrode to a floating state during application of the touch sensor drive signal.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A display device with a touch sensor, comprising:
a display pixel electrode;
a thin-film transistor circuit connected to the display pixel electrode;
a common electrode that is opposed to the display pixel electrodes;
a display function layer configured to display an image;
a display control circuit
configured to apply a display voltage between the display pixel electrode and the common electrode based on an image signal, and configured to control an image display of the display function layer, and configured to apply a touch sensor drive signal to the common electrode;

a touch detection electrode that is opposed to the common electrode and that is configured to form a capacitance between the touch detection electrode and the common electrode;

a gate buffer configured to select between a first wiring and a second wiring to connect the selected wiring to a gate of the thin-film transistor circuit; and a switch arranged between the gate buffer and the second wiring and configured to set the gate buffer to a floating state during application of the touch sensor drive signal, wherein during a vertical blanking period or a horizontal blanking period, a potential of the gate is set to a floating state, in which the gate and the gate buffer are in an electrically open state, in which the switch is set to be opened such that the gate buffer is in the floating state, wherein the display device comprises a plurality of the display pixel electrodes and a plurality of the thin-film transistor circuits, and each of the thin-film transistor circuits is connected to one of the display pixel electrodes on a one-to-one basis, and wherein the display device comprises a plurality of the gate buffers and a plurality of the switches, wherein each of the gate buffers is configured to connect the selected wiring to each of the gates of corresponding thin-film transistor circuits among the plurality of thin-film transistor circuits, and each of the switches is provided for one of the gate buffers on a one-to-one basis.

2. The display device with a touch sensor according to claim 1, wherein a display drive voltage having a fixed voltage amplitude, applied to the common electrode by the display control circuit is utilized as the touch sensor drive signal, and wherein a potential of the gate is set to the floating state, in which the gate and the gate buffer are in an electrically open state, so as to become a potential subjected to coupling by the touch sensor drive signal.

3. The display device with a touch sensor according to claim 1, wherein the first wiring supplies a first voltage to the gate buffer, and the second wiring supplies a second voltage to the gate buffer.

4. The display device with a touch sensor according to claim 1 wherein a display drive voltage having a fixed voltage amplitude, applied to the common electrode by the display control circuit is utilized as the touch sensor drive signal, and wherein a predetermined voltage is applied through the gate buffer to the gate of the thin-film transistor circuit.

5. The display device with a touch sensor according to claim 4, wherein the gate is set to an on state when a first gate voltage is applied to the gate through the gate buffer, wherein the gate is set to an off state when a second gate voltage is applied to the gate through the gate buffer, and wherein during the application of the touch sensor drive signal the gate is set to the floating state, when the switch is opened and the gate is electrically disconnected from the gate buffer.

6. A display device with a touch sensor, comprising:

a display pixel electrode;

a thin-film transistor circuit connected to the display pixel electrode;

a common electrode that is opposed to the display pixel electrodes;

a display function layer configured to display an image;

a display control circuit
configured to apply a display voltage between the display pixel electrode and the common electrode based on an image signal, and configured to control an image display of the display function layer, and
configured to apply a touch sensor drive signal to the common electrode;

a touch detection electrode that is opposed to the common electrode and that is configured to form a capacitance between the touch detection electrode and the common electrode;

a gate buffer configured to select between a first wiring and a second wiring to connect the selected wiring to a gate of the thin-film transistor circuit; and a switch arranged between the gate buffer and the second wiring and configured to set the gate buffer to a floating state during application of the touch sensor drive signal, wherein during a vertical blanking period or a horizontal blanking period, a potential of the gate is set to a floating state, in which the gate and the gate buffer are in an electrically open state, in which the switch is set to be opened such that the gate buffer is in the floating state.

* * * * *